United States Patent [19]
Markevka et al.

[11] Patent Number: 4,820,368
[45] Date of Patent: Apr. 11, 1989

[54] THERMALLY STABLE REACTIVE HOT MELT URETHANE ADHESIVE COMPOSITION HAVING A THERMOPLASTIC POLYMER, A COMPATIBLE, CURING URETHANE POLYALKYLENE POLYOL PREPOLYMER AND A TACKIFYING AGENT

[75] Inventors: Virginia C. Markevka, Maplewood; John M. Zimmel, St. Paul; Elizabeth R. Messman, Minneapolis; William L. Bunnelle, Stillwater, all of Minn.

[73] Assignee: H. B. Fuller Company, St. Paul, Minn.

[21] Appl. No.: 47,686

[22] Filed: May 7, 1987

[51] Int. Cl.$^4$ ............................................. C09J 5/02
[52] U.S. Cl. .............................. 156/307.3; 156/331.4; 525/93; 525/96; 525/111; 525/127; 525/130; 525/455
[58] Field of Search ............. 156/307.3, 331.4; 525/93, 111, 96, 127, 130, 455

[56] References Cited

U.S. PATENT DOCUMENTS

| | | |
|---|---|---|
| 2,432,148 | 12/1947 | Furness et al. |
| 3,108,083 | 10/1963 | Laganis |
| 3,267,063 | 8/1966 | Hudson |
| 3,437,622 | 4/1969 | Dahl |
| 3,488,302 | 1/1970 | Pyron |
| 3,509,232 | 4/1970 | Schollenberger |
| 3,671,301 | 6/1972 | Dahl |
| 3,829,533 | 8/1974 | Matsui et al. |
| 3,914,484 | 10/1975 | Creegan et al. |
| 3,931,077 | 1/1976 | Uchigaki et al. |
| 3,935,144 | 1/1976 | Hagenweiler et al. |
| 3,935,338 | 1/1976 | Robertson |
| 3,970,717 | 7/1976 | Muller-Albrecht et al. |
| 3,979,547 | 9/1976 | Roberts et al. ............ 525/130 |
| 4,013,806 | 3/1977 | Volkert et al. |
| 4,021,391 | 5/1978 | Ijichi et al. |
| 4,066,600 | 1/1978 | Pletcher et al. |
| 4,151,345 | 4/1979 | Hillegass |
| 4,165,307 | 8/1979 | Mizuno et al. |
| 4,205,018 | 5/1980 | Nagasawa et al. |
| 4,217,254 | 8/1980 | Legue ............... 525/130 |
| 4,279,801 | 7/1981 | Kramer et al. |
| 4,352,858 | 10/1982 | Stanley |
| 4,390,678 | 6/1983 | LaBelle et al. |
| 4,412,033 | 10/1983 | LaBelle et al. |
| 4,515,933 | 5/1985 | Chang |
| 4,539,345 | 9/1985 | Hansen ................ 156/331.4 |

FOREIGN PATENT DOCUMENTS

| | | |
|---|---|---|
| 1077352 | 5/1980 | Canada |
| 0199445 | 7/1986 | European Pat. Off. |
| 923085 | 4/1963 | United Kingdom ............ 525/440 |
| 1081705 | 8/1964 | United Kingdom |
| 2137638A | 4/1983 | United Kingdom |

OTHER PUBLICATIONS

One-Package Adhesives from m- and p-TMXDI, published by CYANAMID, Polymer Chemicals Department.
Dynamit Nobel Technical Bulletin, *Dynacoll* ® and *dynapol* ®.
U.S.I. Chemicals Technical Bulletin, *U.S. I. Chemicals Adhesive and coatings resins.*
The Upjohn Polymer Chemical Technical Bulletin, *PAPI* ® 94.
The Upjohn Polymer Chemical Technical Bulletin, *PAPI* ® 20, *Adhesive Materials*, p. 256.
Exxon Chemicals Technical Bulletin, Vistalon ® ethylene-propylene terpolymers.
Exxon Chemicals Technical Bulletin, Vistanex ® polyisobutylene.
Exxon Chemicals Technical Bulletin, Exxon butyl rubber.
Exxon Chemicals Technical Bulletin, Vistalon ® ethylene-propylene copolymers.
A technical bulletin, *Elvax* ® *Resin Grades*.
Exxon Chemicals Technical Bulletin, Escorez ® 2392 petroleum hydrocarbon resin.
Exxon Chemicals Technical Bulletin, Escorez ® 1310 LC petroleum hydrocarbon resin.
Exxon Chemicals Technical Bulletin, Escorez ® 5300 series resins.
Hercules Product Data Bulletin, *Kristalex* ® *3070, 3085, and 3100.*

Primary Examiner—Gallagher John J.
Attorney, Agent, or Firm—Merchant, Gould, Smith, Edell, Welter & Schmidt

[57] ABSTRACT

Hot melt adhesive compositions combining the characteristics of hot melt adhesives and reactive adhesives can be prepared by blending a thermoplastic polymer, having sufficient structural integrity to provide cohesive strength, with a urethane prepolymer and a tackifying agent. The composition has sufficient green strength to form initial bonds. Additionally, over time, the composition cures to a final rigid, resilient structural adhesive bond.

28 Claims, No Drawings

THERMALLY STABLE REACTIVE HOT MELT URETHANE ADHESIVE COMPOSITION HAVING A THERMOPLASTIC POLYMER, A COMPATIBLE, CURING URETHANE POLYALKYLENE POLYOL PREPOLYMER AND A TACKIFYING AGENT

FIELD OF THE INVENTION

The invention relates to an extrudable hot melt, reactive urethane adhesive containing a urethane prepolymer, a tackifying resin and a thermoplastic resin. The solvent-free compositions of this invention can be extruded at elevated temperatures to form strong green bonds, in other words, when the bond line is cooled the composition initially forms bonds of adequate strength. The high quality green bond can maintain the structural integrity of the joined work pieces until the urethane components in the green bond line can react and cure to a hard, resilient, strong cohesively bonded structurally sound mass.

BACKGROUND OF THE INVENTION

Generically, both hot melt adhesives and curing urethane adhesives are well known generic adhesive classes. Hot melt adhesives can be conveniently applied by extruding the adhesive composition at elevated temperatures directly onto a work piece for the purpose of forming a structural bond with another work piece as the temperature of the adhesive compositional mass cools. While hot melt adhesives have many adhesive preparation and workpiece production benefits, hot melt adhesives have the drawback that after cooling to form a bond line, the thermoplastic compositions can be temperature sensitive. In other words, the bonding mass can lose bond strength as the temperature of the work piece and the bond line increase. Further, hot melt adhesives tend to be physically unstable in the presence of hydrocarbon solvents and some other organic compositions.

In sharp contrast, curing urethane adhesives have little green strength. After application of a urethane adhesive, the joined workpieces can require external mechanical support until the urethane adhesive can cure to a strong resilient highly crosslinked bondline. Cured polyurethane bonds have high tensile strength and have little or no temperature sensitivity. Cured urethanes can remain strong as temperatures rise until decomposition occurs, typically at very high temperatures. Such adhesives have value where initial green strength is not important since substantial bond formation requires a period of curing time which can range from a number of hours to a number of days.

Clearly an adhesive displaying both curing and hot melt properties in a single adhesive composition is a desirable goal since the resulting adhesive in theory could possess quick high strength green bond and strong crosslinked cured adhesive bonding.

One suggested adhesive is disclosed in Uchigaki et al, U.S. Pat. No. 3,931,077, which discloses reactive high viscosity hot melt adhesive compositions comprising a specific high viscosity reactive urethane prepolymer, a specific ethylene-vinyl acetate thermoplastic polymer and a phenol or abietic acid-type tackifying resin. Uchigaki teaches that hot melt moisture cure thermosetting adhesives should have a liquid urethane prepolymer having a viscosity higher than 300,000 cP at 25° C. Uchigaki suggests that substantially lower viscosities result in adhesive compositions having a suitable viscosity for application but having inferior instant or green strength. Further, Uchigaki suggests using thermoplastic polymer compositions in the adhesive compositions such as an ethylene-vinyl acetate copolymer wherein the polymer contains ethylene in the range of about 90 to 70 wt-%. Further, Uchigaki suggests that concentrations of less than 70 wt-% ethylene results in adhesives having poor final adhesive strength. Further, Uchigaki teaches that tackifier components that can be used in the hot melt thermosetting adhesives should be a terpene phenol copolymer or an abietic acid type resin whose active hydrogens and double bonds are at least partly removed by esterification and/or hydrogenation. Such compositions include tackifier resins such as hydrogenated rosin, a hydrogenated rosin glycerine ester, a hydrogenated rosin pentaerythritol ester, disproportionated rosin, polymerized rosin, etc. Uchigaki further teaches that other types of tackifiers that are reactive with isocyanate groups on a prepolymer composition are undesirable. Further, Uchigaki suggests that some other types of tackifiers are insufficiently miscible with the adhesive components to result in a stable blend.

A further type of hot melt adhesive is disclosed in Reischle et al, U.S. Pat. No. 4,585,919 which teaches the combination of an isocyanate prepolymer, a thermoplastic polyurethane or polyester, and a synthetic resin selected from the group consisting of ketone resins, hydrogenation products of acetophenone condensation resins, and mixtures thereof.

In formulating reactive compositions, we have found substantial difficulty in obtaining compatible adhesive systems having a production viscosity that remain in a single phase when held at hot melt application temperatures. Many proposed adhesive formulations are not miscible and cannot be mixed under ordinary production conditions to form a stable adhesive mass. Further, even if miscible in production conditions involving severe mixing conditions, the compositions can phase and separate when held at the point of use in hot melt extrusion equipment. Further, certain phase stable mixtures can have poor machining characteristics. Accordingly, obtaining a compatible blend is critical.

We have also found that many curing adhesives when held at elevated temperatures in common application equipment, can suffer substantial rapid viscosity rise when held at elevated temperatures in production. Such a viscosity thermal instability can substantially reduce the value of the adhesives in the marketplace. Preferred adhesives can have stability in the viscosity increase over time such that the increase in viscosity over a 4 to 10 hour period is not substantially greater than about 25%.

BRIEF DESCRIPTION OF THE INVENTION

We have found compatible blends of components that form a reactive hot melt urethane adhesive with heat stability, green bond strength, pot stability and fully cured bond strength that are surprisingly compatible in production and use. The hot melt moisture curable adhesive composition of this invention comprises a urethane prepolymer composition which is a reaction product between a polyalkylene polyol and isocyanate composition, an effective amount of a tackifier resin, and an effective amount of a thermoplastic resin selected from the group consisting of an ethylene-vinyl acetate resin having a vinyl acetate content of about 1-45 mole-%, an A-B-A block copolymer, an amorphous or semi-crystalline polyolefin polymer, a radial A-B block copolymer, an A-(B-A)$_n$-B block copolymer, wherein n is an integer of 2 to 50, each A comprises a polystyrene block and B comprises a rubbery polyolefin block. The novel components of the adhesive composition cooperate to form a melt compatible adhesive composition that has substantial initial green strength, substantial cured bond strength, chemical and heat resistance when cured and extended pot life. We have also found that, with block copolymer compositions, a small amount of an epoxy compound can enhance the pot life, e.g. the thermal stability over time of the adhesive viscosity at the point of use in the hot melt form.

In the context of this invention, the term amorphous means that the chains of the thermoplastic polymer are not crystalline and do not take a solid form in which the polymer chain forms repeating symmetrical units in the solid. In an amorphous or semi-crystalline solid the polymer chains are entirely or predominantly randomly organized in the solid.

DETAILED DESCRIPTION OF THE INVENTION

We have found that the hot melt moisture cure adhesive compositions of the invention comprise a polymer of reduced polarity including a polymer of ethylene-vinyl monomer having a vinyl monomer content of about 1-45 mole-%, a polyolefin polymer, a radial A-B block copolymer, a A-(B-A)$_n$-B block copolymer, or an A-B-A block copolymer in combination with a compatible tackifying resin and a urethane prepolymer comprising the reaction product of a polyalkylene polyol and an isocyanate compound.

PREPOLYMERS

Prepolymers useful in manufacturing the hot melt moisture cure adhesives of this invention comprise an isocyanate capped prepolymer composition made by reacting an isocyanate compound with a polyalkylene polyol.

The term "isocyanate compound" in the context of this invention indicates a typically monomeric small molecule having 2 or more —NCO groups. Isocyanate compounds useful for forming the prepolymer compositions of the invention include organic, aliphatic and aromatic isocyanate compounds having an isocyanate functionality of about 2 or more. The isocyanate compound of the invention can have from 1 to 10 aliphatic or aromatic groups substituted by the isocyanate group. The isocyanate compounds can also contain other substituents which do not substantially adversely affect the viscosity of the isocyanate terminated prepolymers, the adhesive properties of the bond line or the reactivity of the —NCO groups during the formation of the prepolymer. The isocyanate compound can also comprise mixtures of both aromatic and aliphatic isocyanates and isocyanate compounds having both aliphatic and aromatic character.

Typical aromatic isocyanates include diphenylmethane diisocyanate compounds (MDI) including its isomers, carbodiimide modified MDI, diphenylmethane-4,4'-diisocyanate, diphenylmethane-2,2'-diisocyanate, diphenylmethane-2,4'-diisocyanate, and other oligomeric methylene isocyanates; toluene diisocyanate compounds (TDI) including isomers thereof, tetramethylxylene diisocyanate (TMXDI), isomers of naphthylene diisocyanate, isomers of triphenylmethane triisocyanate, and mixtures thereof. Aliphatic di, tri, and polyisocyanates are also useful including for example isophorone diisocyanate, hydrogenated aromatic diisocyanates, aliphatic polyisocyanates, cycloaliphatic polyisocyanates, and others.

Suitable polyalkylene polyols that can be used in the prepolymer have a molecular weight in excess of 250, more typically in excess of 500, most preferably in the molecular weight range of about 500–10,000. Typical polyalkylene polyols comprise a chain of repeating alkylene units providing a major contribution to the molecular weight of the material. A typical polymeric polyol consists essentially of either a linear or branched chain of the repeating units which is terminated with hydroxyl groups and for the sake of simplicity these hydroxyl groups will normally be the active hydrogen containing substituents in the polyol structure reacting with the capping isocyanate compounds. The molecular weight of the polyalkylene polyol is important in the polarity of the final prepolymer composition. Selecting polyalkylene polyols with lower molecular weights and preparing the prepolymers of the invention results in increasing polarity as the molecular weight of the polyol decreases. As the molecular weight of the polyol increases the polarity of the resulting prepolymer is reduced. Since the reduced polarity thermoplastic resins of this invention, i.e. a low vinyl monomer content polymer and the A-B-A, A-(B-A)$_n$-B linear or radial block copolymers are more compatible with the less polar polyalkylene diol prepolymers, the adhesive compatibility can be enhanced by selecting the polarity of the prepolymer composition to match the polarity of the thermoplastic polymer.

The polyalkylene polyols comprise polyalkylene diols. The molecular weights of the preferred polyalkylene polyols typically range from about 500 to 10,000, most preferably 750 to 5,000 for reasons of ultimate prepolymer-thermoplastic resin compatability. Under certain conditions, the release of vaporized diisocyanate monomer can occur during manufacture or application of the adhesive of the invention. In order to reduce the volatility of the diisocyanate monomer, a small amount of a low molecular weight polyol can be added with the polyalkylene diol that will react with low molecular weight diisocyanate compounds.

The preferred hydroxy terminated polyalkylene diol useful in forming the prepolymer compositions of the invention comprise a low molecular weight hydroxy terminated alkadiene diol. Broadly, such compositions are homopolymers and copolymers containing isoprene, butylene and/or butadiene units having 2 terminal hydroxyl groups or more. Theoretical structure of a preferred butadiene homopolymer containing 2 hydroxyl functionalities is shown below:

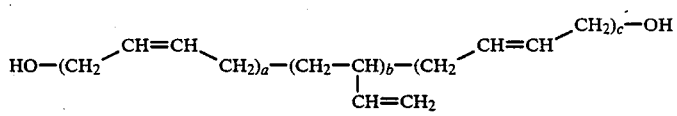

wherein, in one embodiment b comprises about 80-100% of the monomers and in another embodiment a+c comprises about 80-100% of the monomers, the molecular weight of the polymer ranges from about 1,000 to about 5,000, and the measured hydroxyl functionality varies from about 1.5 to 3.5. The hydroxy terminated butadiene copolymers, preferably a butadiene diol, can contain as a comonomer a polymerizable monomer compatible with butadiene which can be used in adjusting the compatibility of the prepolymer composition with the thermoplastic used in the adhesive. For example, the butadiene copolymer can contain styrene, ethylene, hydroxyethyl acrylate, acrylonitrile, or other ethylenically unsaturated vinyl monomer present in the thermoplastic resin of the invention. The most preferred —OH terminated polymers are homopolymers of butylene and hydrogenated homo- or copolymers of isoprene and butadiene for reasons of enhanced thermal stability.

In the hot melt adhesive of this invention, the isocyanate compound reacts with the terminal hydroxyl group to form isocyanate terminated prepolymer compositions having free NCO groups which react with moisture or other active hydrogen containing compound to solidify the green bond line into a stable structure.

THERMOPLASTIC POLYMER COMPONENT

The reactive hot melt adhesive composition of the invention contains a compatible thermoplastic vinyl polymer which cooperates with the other adhesive components to provide initial green strength and cured strength to the inventive compositions. Preferably, the thermoplastic polymer composition is matched in polarity with the urethane-prepolymer polyol composition and with the tackifier. The preferred thermoplastic copolymer component of this invention is selected from the group consisting of (i) vinyl polymers comprising repeating units derived from ethylene and a second polar vinyl monomer, (ii) an A-B-A block copolymer, a radial A-B-type block copolymer, a linear A-(B-A)$_n$-B block copolymer, wherein each A comprises a polystyrene block and B comprises rubbery polyolefin block, and (iii) an amorphous or semi-crystalline polyolefin polymer.

The polyethylene-vinyl monomer composition can be a film-forming thermoplastic polymer having a melt index of about 0.1 to 1000 compatible with the adhesive components of the invention. Preferably the melt index of the polymer ethylene-vinyl monomer is about 0.2 to 500, and the polar vinyl monomer of the ethylene-vinyl monomer composition comprises an acrylate monomer or a vinyl ester monomer of a carboxylic acid compound.

Acrylate monomers that can be used in the film-forming polymer of the invention include acrylic acid, methacrylic acid, acrylamide, methacrylamide, methylacrylate, ethyl acrylate, methylmethacrylate, 2-ethylhexylacrylate, 2-ethylhexylmethacrylate, methoxyethylmethacrylate, methoxyethylacrylate, and others. Acrylate monomers are well known in the art and are selected for copolymerization with ethylene based on the polarity of the monomer. Vinyl esters of carboxylic acids include such monomers as vinyl acetate, vinyl butyrate, and others. The isocyanate capped prepolymers of this invention are formulated to have a polarity compatible with ethylene vinyl acetate (EVA) monomers having about 1-45 wt-% vinyl acetate and a melt index of about 0.1 to 1000. Preferably the EVA contains less than about 28 wt-% vinyl acetate and has a melt index of about 0.2 to 500. The compositions of polymers using other second monomer systems should be formulated to obtain a polarity approximating the polarity of these vinyl acetate polymer compositions.

Other preferred thermoplastic polymers for use in formulating the adhesives of this invention include A-B-A block copolymers wherein each A typically comprises a polystyrene block and B typically comprises a rubbery polyolefin block. Typical A blocks comprise polystyrene, polyalphamethylstyrene, and other similar, aromatic monomer containing, glassy endblock units. Typical B midblock units, that can be either hydrogenated or nonhydrogenated, comprise polymers made from repeating units derived from isoprene, butadiene, and other monomers that can generate rubbery polymeric blocks and mixtures thereof. Included within the above disclosed compositions are styrene isoprene styrene block copolymers having a molecular weight of about 70,000 to 200,000 and about 15 to 50 wt-% styrene, styrene-butadiene-styrene block copolymers having a molecular weight of about 70 to 150,000 and about 20 to 50 wt-% styrene, styrene hydrogenated butadiene styrene block copolymers (i.e. styrene-ethylene-butylene-styrene block copolymers) having a molecular weight of about 50,000 to 100,000 and about 10 to 40 wt-% styrene, and others. Typical examples of such polymers include KRATON ® rubbers and KRATON G ® rubbers.

Amorphous or semi-crystalline polyolefin polymer compositions that can be made compatible in the reactive urethane hot melt adhesive compositions of the invention include polyalphaolefins, rubbery polyolefins, including homopolymers, random copolymers, block copolymers and others. Such polymers are typically made from ethylenically unsaturated monomers having 2-5 carbon atoms. Examples of such polymers include polyalphaolefin such as such as polyethylene, polypropylene, etc.; poly-1-butene, and poly-1-butene alphaolefin copolymers, polyethylene-polyalphaolefin copolymers, ethylene propylene rubbers, ethylene propylene diene terpolymers, polyisobutylene, polyisobutylene copolymers, polyisobutylene-polyisoprene butyl rubbers, acid anhydride and acid grafted polyethylenes, etc. Such nonpolar polymers are typically most compatible with prepolymers having a polyalkylene diol with a molecular weight greater than about 2,000.

TACKIFYING RESIN

The adhesives of the invention contain a tackifying resin in combination with the thermoplastic polymer and the urethane prepolymer. The tackifying resins useful in adhesives of the invention comprise aliphatic, aromatic or aliphatic aromatic tackifying resins including both natural and synthetic terpene resins.

Aliphatic tackifying resins can be formed from generally unsaturated petroleum feedstocks which contain ethylenically unsaturated monomers having 4 or more carbon atoms. Aliphatic resins contain preferably $C_{4-6}$ monomers with conjugated diunsaturation. Typical monomers making up such aliphatic resins include 1,3-butadiene, cis-1,3-pentadiene, trans-1,3-pentadiene, 2-methyl-1,3-butadiene, 2-methyl-2-butene, cyclopentadiene, dicyclopentadiene, and others. Such aliphatic tackifying resins can also be made or obtained from natural sources.

Aromatic resins useful in forming the adhesive compositions of this invention can be prepared from any monomer containing an aromatic moiety and a polymerizable ethylenically unsaturated group. Typical examples of aromatic monomers include styrenic monomers such as styrene, alpha-methyl styrene, vinyl toluene, methoxy styrene, tertiary butyl styrene, chlorostyrene, etc., indene monomers including indene, methylindene and others. Aliphatic aromatic tackifying resins can be made by polymerizing feed streams containing a mixture of one or more aliphatic monomers in combination with one or more aromatic monomers. Typically aromatic aliphatic resins can be formed from the aromatic monomers above in mixture with generally unsaturated petroleum feedstocks which contain $C_{4+}$ monomers. The mixed aromatic aliphatic resins contain preferably $C_{4-6}$ monomers with conjugated diunsaturation.

Typical monomers making up aliphatic hydrocarbon resins include 1,3-butadiene, cis-1,3-pentadiene, trans-1,3-pentadiene, 2-methyl-1,3-butadiene, 2-methyl-2-butene, cyclopentadiene, dicyclopentadiene, and others. Preferred tackifying resins of the invention comprise aliphatic or aliphatic-aromatic copolymers having a molecular weight reflected in a ring and ball softening point that range from about 70° to 160° F. Most preferred tackifying resins for use in the invention comprise aliphatic or aromatic-aliphatic resins having a ring and ball softening point of 70–120.

The reactive urethane adhesive compositions of this invention prepared with ethylene vinyl acetate copolymer thermoplastic resins having less than about 28% wt-% vinyl acetate are typically increased in compatibility if an aliphatic tackifying resin is used. In the instance that a higher polarity of ethylene vinyl acetate thermoplastic copolymer having greater than about 28 wt-% vinyl acetate is used, an aromatic aliphatic resin tends to increase the compatibility of the copolymer. In compositions of this invention comprised of A-B-A block copolymer preferred tackifying resins are styrenic polymers.

The epoxy resins useful in the present invention are commercially available and can have the following general formula:

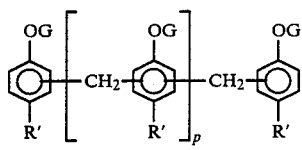

wherein
p is about 0 to 20;
G is

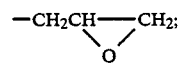

a glycidyl residue; and

R' is independently hydrogen; lower alkyl such as methyl, ethyl, isopropyl, t-butyl, etc.; substituted alkyl groups such as —$CH_2Cl$(chloromethyl), —$CH_2$, phenyl(benzyl), —$CH_2CH_2NH_2$(aminoethyl), —$CH_2$—O—$CH_3$—(methoxy-methylene)methylcyclohexyl, etc; halogen groups such as chloro, bromo, iodo, alkoxy substituents such as methoxy, ethoxy, propoxy; amino groups such as primary amino groups, secondary amino groups such as methylamino, ethylamino, benzyl amino, etc., and tertiary amine groups such as methylethyl amino, ditertiary butyl amino; aromatic substituents such as phenyl groups, naphthyl groups; and reactive substituents such as epoxy groups, glycidyl groups, ethylenically unsaturated groups and nitro derivative;

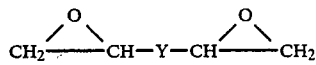

wherein Y is a group resulting from the reaction product of an epihalohydrin such as epichlorohydrin and a polyhydric phenol. Typical polyhydric phenols include such compounds as resorcinol and various bis-phenols resulting from the condensation of phenol with alde-

TABLE 1
EPOXY RESINS

| Epoxy Resins | Structure | Epoxy Equivalent Weight |
|---|---|---|
| Diglycidyl ether of bisphenol A Ciba Geigy Araldite 6010) | | 182–189 |
| Tetraglycidyl MDA (Ciba Geigy Araldite MY-720) | | 125 |
| Polyglycidyl ether of phenol-formaldehyde novolac (Dow DEN-431) | | 172–179 |

hydes and ketones in a well known class of condensation reactions. Representative of commercially available compositions include the novolac composition and bis-phenols such as 2,2'-bis(p-hydroxyphenyl)propane; 4,4'-dihydroxydiphenylsulfonate; 4,4'-dihydroxybiphenyl; 4,4'-dihydroxydiphenylmethane; 2,2'-dihydroxydiphenyloxide. Also useful are the aliphatic and cycloaliphatic epoxides such as limonene dioxide, limonene mono-oxide, alpha-pinene oxide, dicyclopentadiene dioxide, dicyclopentadiene mono-oxide, epoxidized dicyclopentyl alcohol, polybutadiene oxide, $C_{6-16}$ epoxidized alphaolefins such as 1,2-epoxy dodecane, epoxidized unsaturated fatty acids such as epoxidized linoleic acid, epoxidized linolinic acid, epoxidized fatty oils such as soybean oil, etc. The concentration of these components can range from about 0.2 wt-% to 1 wt-% of the adhesive for increased pot stability.

Table 1 lists three epoxy resins which may be utilized in the thermosetting resin of this invention.

The compositions of the invention can contain other compatible polymers, fillers, pigments, dyes, catalysts, inhibitors, antioxidants, UV absorbers, and other conventional additives. The fillers may be in the form of particles or fibers of compositions including ceramics, glass, silica, quartz, mica, treated clay, titanium dioxide, boron nitrides, graphite, carbon black, glass fibers, asbestos fibers, metal powders, etc., the amount of filler depending on particular properties of the composite desired.

In somewhat greater detail, the reactive hot melt urethane adhesives of this invention typically comprise an effective bonding amount of a thermoplastic polymer base to form bonds of initial green strength, an effective amount of a polyurethane prepolymer composition, to form high tensile strength bonds having heat and chemical resistance, comprising the reaction product of (i) a polyalkylene polyol, and (ii) and an isocyanate composition; and a compatible tackifying resin. The reactive hot melt adhesive composition is typically blended in melt under anhydrous inert gas mixing conditions to form a uniform adhesive admixture which is then packaged in a variety of sizes ranging from about 25 g. to 250 kilogram mixtures. In use the compositions are placed in hot melt application equipment under an inert gas blanket, heated to melt temperature for extrusion.

The reactive hot melt adhesive compositions of the invention can be cured in the bond line using a variety of mechanisms. The curing reaction occurs between a compound having an available active hydrogen atom and the NCO groups of the polyurethane prepolymer. A variety of reactive compounds having free active hydrogens are known in the art including water, hydrogen sulfide, polyols, ammonia, and other reactive compounds. Such curing reactions can be conducted by relying on the presence in the atmosphere such as moisture or the reactive compounds can be added to the adhesive at the bond line.

Typically the adhesive compositions of this invention can be prepared using the proportions found in the following Table.

TABLE 2

|  | Typical Adhesive Parts by Weight | Preferred Adhesive Parts by Weight | Most Preferred Adhesive Parts by Weight |
|---|---|---|---|
| Thermoplastic Polymer | 1–200 | 10–180 | 20–100 |
| Prepolymer | 100 | 100 | 100 |

TABLE 2-continued

|  | Typical Adhesive Parts by Weight | Preferred Adhesive Parts by Weight | Most Preferred Adhesive Parts by Weight |
|---|---|---|---|
| Tackifying Resin | 1–200 | 25–195 | 35–120 |

While the choice of component, order of addition, and addition rate can be left to the skilled adhesives chemist, generally the hot melt moisture cure urethane adhesives of this invention can be made by preparing the isocyanate capped prepolymer and blending the prepolymer with the base thermoplastic polymer base and the tackifying agent and other optional ingredients if necessary. The prepolymer phase is typically prepared by reacting the isocyanate compound with the polybutadiene diol compound at elevated reaction temperatures, typically in the range of 100°–400° F. (38°–205° C.). Commonly the polyisocyanate compound is introduced into a suitable reaction vessel, heated to reaction temperature, and into the heated isocyanate compound is placed the hydroxy compound for reaction. Moisture is typically excluded from reaction using dry chemicals and conducting the reaction under vacuum or in the presence of an anhydrous gas blanket. The polyalkylene polyol compound is reacted with the isocyanate compound in the reactive vesel at ratios that typically depend on the hydroxy and isocyanate functionality of the reactants. Typically the compounds are reacted at ratios which result a reaction between isocyanate groups and hydroxy groups leaving essentially no residual hydroxy and minimal isocyanate functionality, typically less than 10 wt-%. Typically the reaction between the polybutadiene diol compound and the isocyanate compound is conducted at an OH:NCO ratio of about 0.75 to 0.16:1 in order to obtain an NCO concentration in the final adhesive of about 1 to 5%. Typically the prepolymer is titrated to measure residual concentration of isocyanate using ASTM D-2572-80 "Standard method for isocyanate group and urethane materials or prepolymers". If the prepolymer composition has acceptable viscosity and isocyanate content, it can be packaged in suitable moisture resistant containers or immediately blended with the balance of the components to form the finished adhesive of the invention.

The adhesives of the invention can be formed into a single package combining the prepolymer, the vinyl polymer base and the tackifying agent. Typically the combination can be made with standard industrial reaction or blending equipment having suitable agitation, temperature control, vacuum and inert atmosphere. Again, in the formation of the finished adhesive composition, blending of the individual components can be left to the skilled adhesives formulator, however we have found that the blending of the composition at elevated temperature is preferably conducted by adding to acceptable blending equipment, the tackifying resin which is melted at an elevated temperature sufficient to melt the composition but to maintain the chemical integrity of the additional components including the isocyanate prepolymer. The melted tackifying resin is agitated and into the resin is added the thermoplastic resin which is mixed under vacuum at a rate such that the ingredients are smoothly combined. The prepolymer is then added into the melt to form a compatible single phase adhesive composition and is typically deaerated.

The following specific Examples, which contain a best mode, can be used to further illustrate the invention.

EXAMPLE I
Prepolymer

Into a glass reaction vessel equipped with a stirrer, nitrogen inlet tube, calcium chloride drying tube and a thermometer was placed 783.7 grams (0.784 equivalents) of a hydrogenated polybutadiene diol (GI-2000, Nisso Ltd., having an average molecular weight of about 2,000). The stirring was initiated and into the reactor was placed 273.9 grams (2.91 equivalents) of methylene bisphenyl diisocyanate (MDI, MONDUR-M, Mobay Chem.). Heating was initiated and the reactor temperature was adjusted to 170°–180° F. and the temperature was maintained for 4 hours. After cooling the NCO value was 5.0±0.5% and the viscosity was 19,000 cPs at 150° F.

Example II

Example I was repeated except that 785 grams (0,78 equivalents) of a hyrogenated polybutadiene diol (POLYTAIL HA, Mitsubishi Chemical Industries) and 259.4 grams (2.07 equivalents) of methylene bisphenyl diisocyanate (MDI) was substituted for the polybutadiene diol and the MDI of Example I. At the conclusion of the reaction percent free NCO was about 5.0±0.5 wt-% and the final viscosity at 130° F. was 30000 cPs.

Example III

Into a 2 liter reaction kettle equipped with a condenser, stirrer, nitrogen inlet tube, and thermometer was charged 1170.3 grams (0.78 equivalents) of a hydrogenated polybutadiene diol having a molecular weightof about 3,000 (GI-3000, Nisso, Ltd.). The contents of the mixer was heated and subject to a 28 inch mercury vacuum for 30 minutes under stirring to remove water. The reaction kettle was allowed to cool to 130° F. and into the cooled stirred diol was added 319.1 grams of methylene bisphenyl diisocyanate (2.5 equivalents, MONDUR-M, Mobay Chem.). The reaction temperature was raised to 170°–180° F. and the reaction was continued for 4 hours. The reaction was terminated, the reaction mixture was cooled, and the percent free NCO was 5.0±0.5% with a final 150° F. viscosity of 17500±500 cPs.

Example IV

Into a glass reactor vessel equipped with a stirrer, nitrogen inlet tube, thermometer and calcium chloride drying tube was added 801.3 grams of a hydrogenated polybutadiene diol having an average molecular weight of about 1,000 (1.19 equivalents, Nisso Ltd.). Stirring was initiated and into the diol was placed 314.1 grams of a methylene biphenyl diisocyanate (2.51 equivalents, MONDUR-M, Mobay Chem.). The temperature was raised to 170°–180° F. and the reaction was permitted to continue for 4 hours. At the end of the reaction the final percent NCO was 5.0±0.5% and the final viscosity was 1300 cPs at 150° F.

Example V
Adhesive

Into a heated double arm sigma blade mixer equipped with a vacuum source and an inert gas source was placed 40 parts of a styrenated synthetic terpene tackifying resin (WINGTACK PLUS). The resin was melted and into the stirred melt was placed 29.5 parts of an A-B-A-polystyrene-polyisoprenepolystyrene block copolymer rubber (KRATON ® 1107, 14 wt-% styrene) with 0.5 parts of a zinc di-n-butyl dithiocarbamate antioxidant (BUTYLZIRAM). The mixer was operated until the components were blended under vacuum until smooth. When smooth the vacuum was removed with inert gas and 30 parts of the prepolymer of Example III was added to the heated mixer. The vacuum was restored and the mixer was operated until smooth over approximately a 25 minute period.

A portion of the adhesive was transferred to an Acumeter bench top coater and coated at 1 mil to #60 chrome coat substrate. The adhesive film on the coated stock was extremely tacky and cohesive. 180° shear adhesion tests were conducted. The results obtained are as follows:

TABLE 1

| Cure Time | Failure Temperature |
|---|---|
| 0 (Initial) | 120° F. |
| One day | 138° F. |
| Four days | 216° F. |
| Six days | 231° F. |
| Seven days | 238° F. |
| Sixteen days | 254° F. |

The results of the test clearly indicates that the material has substantial initial green strength and after a period of time generates substantial cured urethane bonding.

Example VI

Into a high shear sigma blade mixer equipped with a nitrogen blanket and vacuum source heated to 350° F. was placed 40 parts of a styrenated terpene resin (ZONATAC 105 LITE). The tackifying resin in the mixer was heated until melted and into the melt was placed 24.5 parts of a polystyrene-polybutadiene-polystyrene A-B-A block copolymer having a styrene content of 28% (KRATON ® 1102). The contents of the mixer was heated and stirred under vacuum until smooth and into the mixture was added 0.5 parts of a diglycidyl ether of bisphenol A (EPON 828). The contents of the mixer were mixed for 10 minutes until smooth and into the melt was placed 35 parts of the prepolymer composition of Example I. The composition was mixed under vacuum until uniform. The composition was discharged into containers and sealed against atmospheric moisture with a nitrogen blanket.

Example VII

Example VI was repeated except that 40 parts of a styrenated synthetic terpene resin (WINGTACK PLUS) and 24.5 parts of a polystyrene-polyisoprene-polystyrene A-B-A block copolymer having a styrene content of 17wt-% (KRATON ® 1117) were substituted for the resin and A-B-A block copolymer of Example V. The thermosel viscosity (300° F., #27 spindle, 20 r.p.m. after 24 hours) showed a 4.5% increase.

Example VIII

Example VII was repeated except that 35 parts of the prepolymer of Example IV was substituted for the prepolymer of Example I.

Example IX

Example VI was repeated except that 35 parts of the prepolymer of Example IV was substituted for the prepolymer of Example I.

Example X

Example VII was repeated except that 29.5 parts of KRATON ® 1117 was used and 30 parts of the prepolymer of Example II.

Example XI

Into a heated double arm sigma blade mixer equipped with a vacuum source and an inert gas source was placed 55 parts of styrenated terpene tackifying resin (ZONATAC 105 LITE). To the molten tackifying resin was added 14.5 parts of an S-EB-S copolymer having a styrene content of 14% (KRATON G 1657) and 0.5 parts of a diglycidyl ether of bisphenol A (EPON 828). The mixer was operated under vacuum until all the components were smooth. When smooth the vacuum was removed with inert gas and 30 parts of the prepolymer from Example I were added to the heated mixer. The vacuum was restored and the mixer was operated until smooth over approximately a 25-minute period.

Example XII

Example XI was repeated except that 30 parts of the prepolymer from Example II was substituted for the prepolymer of Example I.

Example XIII

Example XI was repeated except that 30 parts of the prepolymer from Example III was substituted for the prepolymer of Example I.

| | |
|---|---|
| Green Strength (dynes/cm$^2$) (25° C.) | 4.191 ± 0.052 E6 |
| Green Strength (dynes/cm$^2$) (40° C.) | 4.779 ± 0.049 E5 |
| 200 g Peel | 148 ± 2° F. |
| Ultimate Tensile (1 week cure) | 263.6 psi |
| % Elongation (at break) | 646.3% |
| Initial Viscosity, 300° F. | 7,050 cPs |
| 4-hour Viscosity, 300° F. | 6,875 cPs |

Example XIV

Into a heated double arm sigma blade mixer equipped with a vacuum source and an inert gas source was placed 15 parts of polyisobutylene polyisoprene rubber (EXXON Butyl 065), 0.8 mole-% unsaturation, 350,000 viscosity average molecular weight with 35 parts of an aliphatic hydrocarbon tackifying resin (ESCOREZ 1310 LC). The mixer was operated until the components were smooth. Into the mixer was added 10 parts of a 180° F. softening point microcrystalline wax. The mixer contents were mixed in under vacuum until smooth. When smooth the vacuum was removed with inert gas and 40 parts of the prepolymer of Example III was added to the heated mixer. The vacuum was restored and the mixer was operated until smooth over approximately a 30 minute period.

| | |
|---|---|
| Green Strength (dynes/cm$^2$) (25° C.) | 2.716 E7 |
| Green Strength (dynes/cm$^2$) (40° C.) | 2.872 E6 |
| 200 g Peel | 129 ± 3° F. |
| Ultimate Tensile | 99.70 ± 9.7 psi |
| % Elongation (at break) | 293% ± 62% |
| Initial Viscosity, 300° F. | 34,550 cPs |
| 4-hour Viscosity, 300° F. | 36,000 cPs |

Example XV

Into a heated double arm sigma blade mixer equipped with a vacuum source and an inert gas source was placed 40 parts of an aliphatic/aromatic hydrocarbon tackifying resin (ESCOREZ 2393) which was melted and blended with 20 parts of an ethylene-vinyl acetate copolymer having a melt index of 1.7–2.3 and 24.3–25.7% vinyl acetate (ELVAX 360). The mixer was operated under vacuum until smooth. When smooth the vacuum was removed with inert gas and 40 parts of the prepolymer of Example III was added to the heated mixer. The vacuum was restored and the mixer was operated until smooth over approximately a 30-minute period.

| | |
|---|---|
| Green Strength (dynes/cm$^2$) (25° C.) | 1.234 E6 |
| Green Strength (dynes/cm$^2$) (40° C.) | 5.177 E5 |
| 200 g Peel | 150 ± 2° F. |
| Ultimate Tensile | 341.43 ± 22.7 psi |
| % Elongation (at break) | 1300.2% ± 165.1% |
| Initial Viscosity, 300° F. | 15,400 cPs |
| 4-hour Viscosity, 300° F. | 14,700 cPs |

Example XVI

Into a heated double arm sigma blade mixer equipped with a vacuum source and an inert gas source was placed 40 parts of an aliphatic/aromatic hydrocarbon tackifying resin (ESCOREZ 2393) which was melted and blended with 20 parts of an ethylene-vinyl acetate copolymer having a melt index of 1.7–2.3 and 24.3–25.7% vinyl acetate (ELVAX 360). The mixer was operated under vacuum until smooth. When smooth the vacuum was removed with inert gas and 40 parts of the prepolymer of Example I was added to the heated mixer. The vacuum was restored and the mixer was operated until smooth over approximately a 30-minute period.

| | |
|---|---|
| Green Strength (dynes/cm$^2$) (25° C.) | 1.537 E6 |
| Green Strength (dynes/cm$^2$) (40° C.) | 5.879 E5 |
| 200 g Peel | 150 ± 1° F. |
| Ultimate Tensile | 381.03 ± 53.8 psi |
| % Elongation (at break) | 1008% ± 165% |
| Initial Viscosity, 300° F. | 16,700 cPs |
| 4-hour Viscosity, 300° F. | 15,600 cPs |

The data above were obtained with the following procedures:

200 Gram Peel Test

Scope:

Kraft paper is laminated to form a one inch by one inch bond area. Weights are attached in the peel mode and the samples are placed in an oven. The oven is programmed to increase at a certain rate of temperature. The temperature at which the bond delaminates is recorded.

Equipment:

1. Programmable oven capable of a 25° C. per hour increase from 25° C. to 150° C.
2. 40 pound basis weight kraft paper.

3. 200 gram weights.
4. Device for monitoring oven temperatures.
5. Device for supporting samples in the oven.
6. Release paper.
7. Two glass rods, each one-half inch in diameter and eight inches long. One glass rod should have a ten mil shim at each end.

Sample Preparation

1. Cut two sheets of kraft paper, each six inches by twelve inches.
2. Cut two pieces of release paper, each two inches by twelve inches.
3. Tape one piece of kraft paper to a heat insulator such as a tablet back, heavy chip board, etc.
4. Tape the two pieces of release paper to the kraft lengthwise in the center, exactly one inch apart.
5. Lay the second piece of kraft paper on top of the release paper so it entirely covers the first piece of kraft paper. Tape one end only of the second piece of kraft to the composite.
6. Fold back the second piece of kraft and place the shimmed glass rod on the tape "hinge".
7. Place the unshimmed glass rod below the second sheet of kraft paper as close to the tape "hinge" as possible. (The second piece of kraft is now between the two glass rods. The shimmed rod is on top in view. The unshimmed rod is partially concealed by the second piece of kraft because it is folded back.)
8. Pour a stream of hot melt at its normal application temperature, (e.g., 350°F.) onto the first piece of kraft between the release paper.
9. Quickly push both glass rods across the bottom sheet of kraft paper. (The shimmed glass rod will draw the hot melt into a film, and the second rod will pull the second piece of kraft paper over the first to form a bond.)
10. Trim the "sandwich" widthwise to four inches and lengthwise to six inches.
11. Cut the "sandwich" widthwise into six pieces, each one inch by four inches.
12. Allow bonds to fully cure in a room at 25° C., 50% RH.

Procedure:

1. Suspend the six samples, from one "tail" in the oven.
2. Attach a 100 gram weight to a tail of each sample inthe peel mode.
3. Start the oven at 25° C. and increase the temperature continuously at 25° C./hour.
4. Observe the samples and note the temperature at which the samples delaminate and the weight falls.

Report:

Report the average temperature at which the samples fail.

Tensile/Elongation Test

Scope:

This test procedure describes the method whereby the tensile characteristics can be determined at a constant strain rate.

Equipment:

1. Instron tensile tester or equivalent.
2. Teflon drawdown sheet.
3. ASTM D-412 Type C die.
4. Micrometer.

Sample Preparation:

1. Prepare a 20 to 30 mil adhesive film. The film must be void free.
2. Allow the film to cure in a room at 25° C., 50% RH.
3. Cut at least five samples from the film with the ASTM D-412 Type C die.
4. Measure the film thickness of each sample at the gauge section in the middle and record. If properly cut, the sample should have a gauge section width of 0.25 inches, but check to be sure.
5. Condition the samples for at least 18 hours at 25° C., 50% relative humidity.

Test Procedure:

1. Set the tensile tester jaws to a 2" gap, and attach the sample.
2. Elongate at the constant strain rate of 10" per minute until the sample breaks, while recording the stress versus strain.
3. Repeat steps 1 and 2 with the remaining samples.

Calculations:

1. Tensile stress-calculate the tensile by dividing the force by the cross-sectional area of the sample.
2. Strain elongation-calculate the elongation by dividing the sample length or tensile tester jaw gap at the point in question by the initial sample gap and multiply by 100%.

Report:

1. Elongation at break as the average of at least 5 samples.
2. Ultimate tensile and elongation at the highest point of stress as the average of at least 5 samples.
3. Tensile and elongation at the yield point as the average of at least 5 samples.

Initial Green Strength Test

Scope:

This method describes the procedure for quantifying initial green strength using the Rheometrics Dynamic Spectometer.

Summary of Method:

The complex modulus of a sample of adhesive is measured at a given frequency and at two different temperatures.

Equipment:

1. Rheometrics Dynamic Spectrometer with nitrogen controller, mid-range transducer.
2. 12.5 mm parallel plate fixture.
3. Adhesive sample (uncured) 10–20 g.

Procedure:

1. Place sample between plates and increase the chamber temperature to a point where the material will flow under compression. Adjust the sample thickness (gap) to 1.5 to 2.5 mm.
2. Set frequency at 1.0 radians/second.
3. Set strain at 1%.
4. Condition sample at 25° C.
5. Run single measurement at least five times.
6. Adjust temperature to 40° C. and repeat step 5. Adjust strain if necessary.

Report:

1. Report average complex modulus ($G^*$) for five measurements at two temperatures.
2. Report temperature and percent strain for each measurement.

Cure Rate of Urethane Adhesive by NCO Determination

Scope:

This method describes the procedure for determining the cure rate by NCO determination.

Equipment:
1. See standard procedure for % NCO determination of urethanes with low isocyanate.
2. Glass rod for making 20 to 30 mil hot melt films.
3. Teflon sheet approximately 12"×24".
4. Constant temperature/humidity environment.
5. Molten adhesive sample.

Procedure:
1. Determine the quantity of sample required by estimating the number of days to a full cure.
2. Draw down 20–30 mil films on a clean teflon sheet.
3. Run NCO determination on an initial, zero time sample.
4. Place teflon sheets and adhesive in a constant temperature (25° C.) and constant humidity (50% RH) environment.
5. Remove enough sample to run NCO determination every 24 hours until % NCO<0.1%.

Report:
1. % NCO every 24 hours.
2. Temperature and humidity readings.
3. Report time under cure conditions (% RH, days).

Viscosity Stability Test

Scope:
This method describes the procedure for measuring thermal stability by tracking viscosity versus time using a Brookfield Thermosel Viscometer.

Equipment:
1. Brookfield Thermosel Viscometer with a chart recorder.
2. Adhesive sample (8–13 g.).

Procedure:
1. Weight out the appropriate amount of sample (8 grams for spindle 21; 10.5 grams for spindle 28; 13 grams for spindle 29) and place it in the thermosel chamber.
2. Set temperature at 300° F. and note the time.
3. Run a continuous viscosity for eight hours or until sample gels. Run chart recorder to track viscosity over time.

Report:
1. Initial and final viscosity (include time elapsed).
2. Spindle and speed used.
3. Percent increase or decrease per hour.
4. Graph of viscosity versus time over time period measured.

The above specification, Examples and data provide for an understanding of the invention. However, since many embodiments of the invention can be made without departing from the spirit and scope of the invention, the invention resides in the claims hereinafter appended.

We claim:

1. A reactive hot-melt urethane adhesive composition having pot stability, initial green strength, bond heat stability, and cured bond strength which comprises:
  (a) a urethane prepolymer composition comprising the reaction product of a polyalkylene diol or triol and an isocyanate compound;
  (b) about 1 to 200 parts by weight per each 100 parts of the prepolymer composition of a thermoplastic polymer selected from the group consisting of an A-B-A block copolymer, an A-(B-A)$_n$-B block copolymer, and a radial A-B-A block copolymer wherein n is an integer from about 2–50, each A is a polystyrene block and each B is a rubbery block; and
  (c) about 1 to 200 parts by weight per each 100 parts of the prepolymer composition of an aliphatic, aromatic or mixed aliphatic-aromatic tackifying resin.

2. The adhesive of claim 1 wherein the structural thermoplastic polymer composition comprises an A-B-A block copolymer having a polyisoprene or a polybutadiene B block, molecular weight of about 200 to 200,000, and a styrene content of about 10 to 50 wt-%.

3. The adhesive of claim 1 wherein the structural thermoplastic polymer composition comprises an A-B-A block copolymer having a rubbery ethylene butylene B block, a molecular weight of about 50,000 to 100,000, and about 10 to 40 wt-% styrene.

4. The adhesive of claim 3 wherein the reactive urethane prepolymer composition comprises the reaction product of a polyalkylene diol having a molecular weight of greater than about 1500, and an isocyanate compound.

5. The adhesive composition of claim 2 wherein the reactive urethane prepolymer composition comprises the reaction product of a polyalkylene diol having a molecular weight of less than about 2500 and an isocyanate compound.

6. The composition of claim 4 wherein the tackifying resin comprises an aromatic, aliphatic or an aromatic-aliphatic tackifying resin.

7. The composition of claim 5 wherein the tackifying resin comprises an aromatic, aliphatic or an aliphatic-aromatic resin.

8. The adhesive of claim 4 wherein the polyalkylene diol comprises a polybutadiene diol.

9. The adhesive of claim 5 wherein the polyalkylene diol comprises a polybutadiene diol.

10. The adhesive of claim 8 wherein the polybutadiene diol comprises a hydrogenated polybutadiene diol.

11. The adhesive of claim 9 wherein the polybutadiene diol comprises a hydrogenated polybutadiene diol.

12. A reactive hot-melt urethane adhesive composition having pot stability, initial green strength, bond heat stability, and cured bond strength which comprises:
  (a) a urethane prepolymer composition comprising the reaction product of a polyalkylene diol or triol and an isocyanate compound;
  (b) about 1 to 200 parts by weight per each 100 parts of the urethane prepolymer of a structural thermoplastic polymer composition comprising an ethylene vinyl monomer copolymer having a melt index of about 0.1 to 1000 and a vinyl monomer content of about 10 to 40 wt-%;
  (c) about 1 to 200 parts by weight per each 100 parts of the prepolymer composition of an aliphatic, aromatic or aliphatic-aromatic tackifying resin.

13. The adhesive composition of claim 12 wherein the ethylene vinyl monomer copolymer composition comprises an ethylene vinyl acetate.

14. The adhesive composition of claim 13 wherein the ethylene vinyl acetate copolymer comprises 1 to 28 wt-% vinyl acetate.

15. The adhesive composition of claim 13 wherein the ethylene vinyl acetate copolymer comprises 18 to 40 wt-% vinyl acetate.

16. The adhesive composition of claim 14 wherein the prepolymer composition comprises the reaction product of a polyalkylene diol having a molecular weight of greater than about 1500.

17. The adhesive composition of claim 15 wherein the active urethane prepolymer composition comprises the reaction product of a polyalkylene diol having a molecular weight of less than about 2500.

18. The composition of claim 16 wherein the polyalkylene diol comprises a polybutadiene diol.

19. The adhesive of claim 17 wherein the polyalkylene diol comprises a polybutadiene diol.

20. The adhesive of claim 18 wherein the polybutadiene diol comprises a hydrogenated polybutadiene diol.

21. The adhesive of claim 19 wherein the polybutadiene diol comprises a hydrogenated polybutadiene diol.

22. The adhesive of claim 1 wherein the reactive urethane hot melt adhesive composition additionally comprises an epoxy compound.

23. A reactive hot-melt urethane adhesive composition having pot stability, initial green strength, bond heat stability, and cured bond strength which comprises:
  (a) a urethane prepolymer composition comprising the reaction product of a polyalkylene diol or triol and an isocyanate compound;
  (b) about 1 to 200 parts by weight per each 100 parts of the prepolymer composition of a thermoplastic structural polymer composition comprising a polyolefin polymer; and
  (c) about 1 to 200 parts by weight per each 100 parts of the prepolymer composition of an aliphatic, or aliphatic-aromatic tackifying resin.

24. The adhesive composition of claim 23 wherein the active urethane prepolymer composition comprises the reaction product of a polyalkylene diol having a molecular weight range of 2000 to 4000.

25. The adhesive of claim 24 wherein the polyalkylene diol comprises a polybutadiene diol.

26. The adhesive of claim 25 wherein the polybutadiene diol comprises a hydrogenated polybutadiene diol.

27. A method of bonding at least two substrates which comprises applying to a bondline that can join at least two surfaces an effective bonding amount of the adhesive of claim 1 and curing the adhesive.

28. The method of claim 27 wherein the adhesive is cured through reaction with atmospheric moisture.

* * * * *

UNITED STATES PATENT AND TRADEMARK OFFICE
CERTIFICATE OF CORRECTION

PATENT NO. : 4,820,368

DATED : April 11, 1989

INVENTOR(S) : VIRGINIA C. MARHEVKA et al

It is certified that error appears in the above-identified patent and that said Letters Patent is hereby corrected as shown below:

Title page:

Item [75], for "Virginia C. Markevka" read --Virginia C. Marhevka--.
Column 6, line 37, for "such as such as" read --such as--.
Column 7, line 19, for "takcifying" read --tackifying--.
Column 9, line 38, for "and (ii) and" read --and (ii)--.
Column 10, line 28, for "vesel" read --vessel--.
Column 11, line 22, for "0,78" read --0.78--.
Column 11, line 36, for "weightof" read --weight of--.
Column 11, line 56, for "biphenyl" read --bisphenyl--.
Column 15, line 47, for "inthe" read --in the--.
Column 16, line 37, for "Spectometer" read --Spectrometer--.

Signed and Sealed this

Twenty-third Day of January, 1990

*Attest:*

JEFFREY M. SAMUELS

*Attesting Officer*      *Acting Commissioner of Patents and Trademarks*